US012750547B2

(12) United States Patent
Cui et al.

(10) Patent No.: US 12,750,547 B2
(45) Date of Patent: Sep. 29, 2026

(54) MULTI-SCREEN VIDEO DISPLAY METHOD AND SYSTEM, AND PLAYING END AND STORAGE MEDIUM

(71) Applicant: BOE Technology Group Co., Ltd., Beijing (CN)

(72) Inventors: Tenghe Cui, Beijing (CN); Long Shu, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 257 days.

(21) Appl. No.: 18/705,534

(22) PCT Filed: Aug. 2, 2023

(86) PCT No.: PCT/CN2023/110774
§ 371 (c)(1),
(2) Date: Apr. 27, 2024

(87) PCT Pub. No.: WO2024/027768
PCT Pub. Date: Feb. 8, 2024

(65) Prior Publication Data

US 2026/0129257 A1 May 7, 2026

(30) Foreign Application Priority Data

Aug. 4, 2022 (CN) ......................... 202210933499.6

(51) Int. Cl.
*H04N 21/43* (2011.01)
*G11B 27/34* (2006.01)
*G11B 27/36* (2006.01)

(52) U.S. Cl.
CPC ....... *H04N 21/43076* (2020.08); *G11B 27/34* (2013.01); *G11B 27/36* (2013.01)

(58) Field of Classification Search
CPC ............ H04L 65/601; H04N 21/43076; H04N 21/4302; H04N 21/43072
See application file for complete search history.

(56) References Cited

U.S. PATENT DOCUMENTS

2008/0022352 A1 1/2008 Seo et al.
2014/0229998 A1* 8/2014 Oh .......................... H04L 65/70 725/74

(Continued)

FOREIGN PATENT DOCUMENTS

CN 106454010 A 2/2017
CN 111541913 A 8/2020

(Continued)

OTHER PUBLICATIONS

International Search Report for PCT/CN2023/110774 Mailed Nov. 8, 2023.

(Continued)

*Primary Examiner* — Kyle M Lotfi

(57) ABSTRACT

A multi-screen video display method and system, and a playing end and a storage medium. The multi-screen video display method comprises: a slave playing end decoding a preset number of video frames and storing same, sending a ready signal to a master playing end; the slave playing end receiving a start playing notification of the master playing end and starting to play video frames; the slave playing end receiving information of a frame to be displayed of the master playing end, calculating an adaptive synchronization threshold value range according to the information of the frame to be displayed of the master playing end; the slave playing end comparing a display timestamp of a frame to be displayed of the slave playing end with the calculated adaptive synchronization threshold value range, to deter- (Continued)

mine whether a playing progress of the slave playing end is synchronized with that of the master playing end.

18 Claims, 8 Drawing Sheets

(56) References Cited

U.S. PATENT DOCUMENTS

| | | | | |
|---|---|---|---|---|
| 2020/0389646 | A1* | 12/2020 | Abe | H04N 19/103 |
| 2021/0044778 | A1* | 2/2021 | Wang | H04N 5/2624 |
| 2021/0344993 | A1* | 11/2021 | Epstein | H04N 21/42615 |
| 2022/0113928 | A1 | 4/2022 | Qin et al. | |
| 2024/0298059 | A1* | 9/2024 | Cho | H04N 21/439 |

FOREIGN PATENT DOCUMENTS

| | | | |
|---|---|---|---|
| CN | 111897505 | A | 11/2020 |
| CN | 111954050 | A | 11/2020 |
| CN | 112511887 | A | 3/2021 |
| CN | 113050902 | A | 6/2021 |
| CN | 113691847 | A | 11/2021 |
| CN | 114816286 | A | 7/2022 |
| CN | 114816305 | A | 7/2022 |
| CN | 115297274 | A | 11/2022 |

OTHER PUBLICATIONS

Office Action dated Jan. 23, 2025 for CN2022109334996 English Translation.

* cited by examiner

MULTI-SCREEN VIDEO DISPLAY METHOD AND SYSTEM, AND PLAYING END AND STORAGE MEDIUM

CROSS-REFERENCE TO RELATED APPLICATIONS

The present application is a U.S. National Phase Entry of International Application No. PCT/CN2023/110774 having an international filing date of Aug. 2, 2023, which claims the priority of the patent application No. 202210933499.6, filed to the CNIPA on Aug. 4, 2022, the contents of which are incorporated into the present application by reference in their entities.

TECHNICAL FIELD

Embodiments of the present disclosure relate to, but are not limited to, the technical field of playing, in particular to a method, system, playing terminal for multi-screen video display, and a storage medium.

BACKGROUND

At present, the video synchronization of large spliced screens is usually realized by hardware (for example, Field Programmable Gate Array (FPGA), etc.), but the hardware implementation cost is much higher than the software implementation cost, and the hardware implementation scheme has some problems such as inflexible use and deployment, complex installation and debugging, and difficult expansion.

Another scheme is to realize multi-screen synchronization of ultra-high definition video by software. Although the software scheme can greatly reduce the hardware cost, since the software scheme is usually realized by synchronous transmission, the synchronization effect is greatly affected by the fluctuation of code stream transmission, and the ability difference of video decoders is ignored, so the synchronization effect is not as desired.

SUMMARY

The following is a summary of subject matters described herein in detail. This summary is not intended to limit the protection scope of the claims.

An embodiment of the present disclosure provides a method for multi-screen video display, including: a master playing terminal detects whether all slave playing terminals and the master playing terminal have decoded and stored a preset number of video frame; and after detecting that all the slave playing terminals and the master playing terminal have decoded and stored the preset number of video frames, the master playing terminal notifies all the slave playing terminals to start playing.

An embodiment of the present disclosure also provides a playing terminal, which includes: a memory and a processor coupled to the memory, wherein the processor is configured to perform acts of the method for multi-screen video display as described in any embodiment of the present disclosure based on instructions stored in the memory.

An embodiment of the present disclosure also provides a storage medium on which a computer program is stored, and when the program is executed by the processor, the method for multi-screen video display as described in any embodiment of the present disclosure is implemented.

An embodiment of the present disclosure further provides a method for multi-screen video display, including: a slave playing terminal decodes and stores a preset number of video frames, and sends a ready signal to a master playing terminal; the slave playing terminal receives a playing start notification from the master playing terminal and starts playing video frames; the slave playing terminal receives information of a frame to be displayed on the master playing terminal, and calculates an adaptive synchronization threshold range according to the information of the frame to be displayed on the master playing terminal; and the slave playing terminal compares a presentation time stamp of a frame to be displayed on the slave playing terminal with the calculated adaptive synchronization threshold range, so as to determine whether a playing progress of the slave playing terminal and a playing progress of the master playing terminal are synchronized.

An embodiment of the disclosure also provides a playing terminal, which includes: a memory and a processor coupled to the memory, wherein the processor is configured to perform acts of the method for multi-screen video display as described in any embodiment of the present disclosure based on instructions stored in the memory.

An embodiment of the present disclosure also provides a storage medium on which a computer program is stored, and when the program is executed by the processor, the method for multi-screen video display as described in any embodiment of the present disclosure is implemented.

An embodiment of the present disclosure further provides a method for multi-screen video display, including: a master playing terminal detects whether all slave playing terminals and the master playing terminal have decoded and stored a preset number of video frames; after detecting that all the slave playing terminals and the master playing terminal have decoded and stored the preset number of video frames, the master playing terminal notifies all the slave playing terminals to start playing; the master playing terminal sends information of a frame to be displayed on the master playing terminal to all the slave playing terminals; and each slave playing terminal receives the information of the frame to be displayed on the master playing terminal, and calculates an adaptive synchronization threshold range according to the information of the frame to be displayed on the master playing terminal, and compares a presentation time stamp of its own frame to be displayed with the calculated adaptive synchronization threshold range to determine whether a playing progress of the playing terminal is synchronized with a playing progress of the master playing terminal.

An embodiment of the present disclosure also provides a system for multi-screen video display, which includes a plurality of playing terminals, and the playing terminals include one master playing terminal and one or more slave playing terminals.

The master playing terminal is configured to detect whether all slave playing terminals and the master playing terminal have decoded and stored a preset number of video frames, notify all the slave playing terminals to start playing after detecting that all the slave playing terminals and the master playing terminals have decoded and stored the preset number of video frames, and send information of a frame to be displayed on the master playing terminal to all the slave playing terminals in the playing process.

The slave playing terminal is configured to receive the information of the frame to be displayed on the master playing terminal, and calculate an adaptive synchronization threshold range according to the information of the frame to be displayed on the master playing terminal, and compares a presentation time stamp of its own frame to be displayed with the calculated adaptive synchronization threshold range to determine whether its own playing progress is synchronized with a playing progress of the master playing terminal.

Other aspects may be comprehended upon reading and understanding drawings and detailed description.

BRIEF DESCRIPTION OF DRAWINGS

Accompany drawings are used to provide further understanding of technical solutions of the present disclosure, and form a part of the specification. The accompany drawings and embodiments of the present disclosure are adopted to explain the technical solutions of the present disclosure, and do not form limitations on the technical solution of the present disclosure.

DETAILED DESCRIPTION

Figure 1:
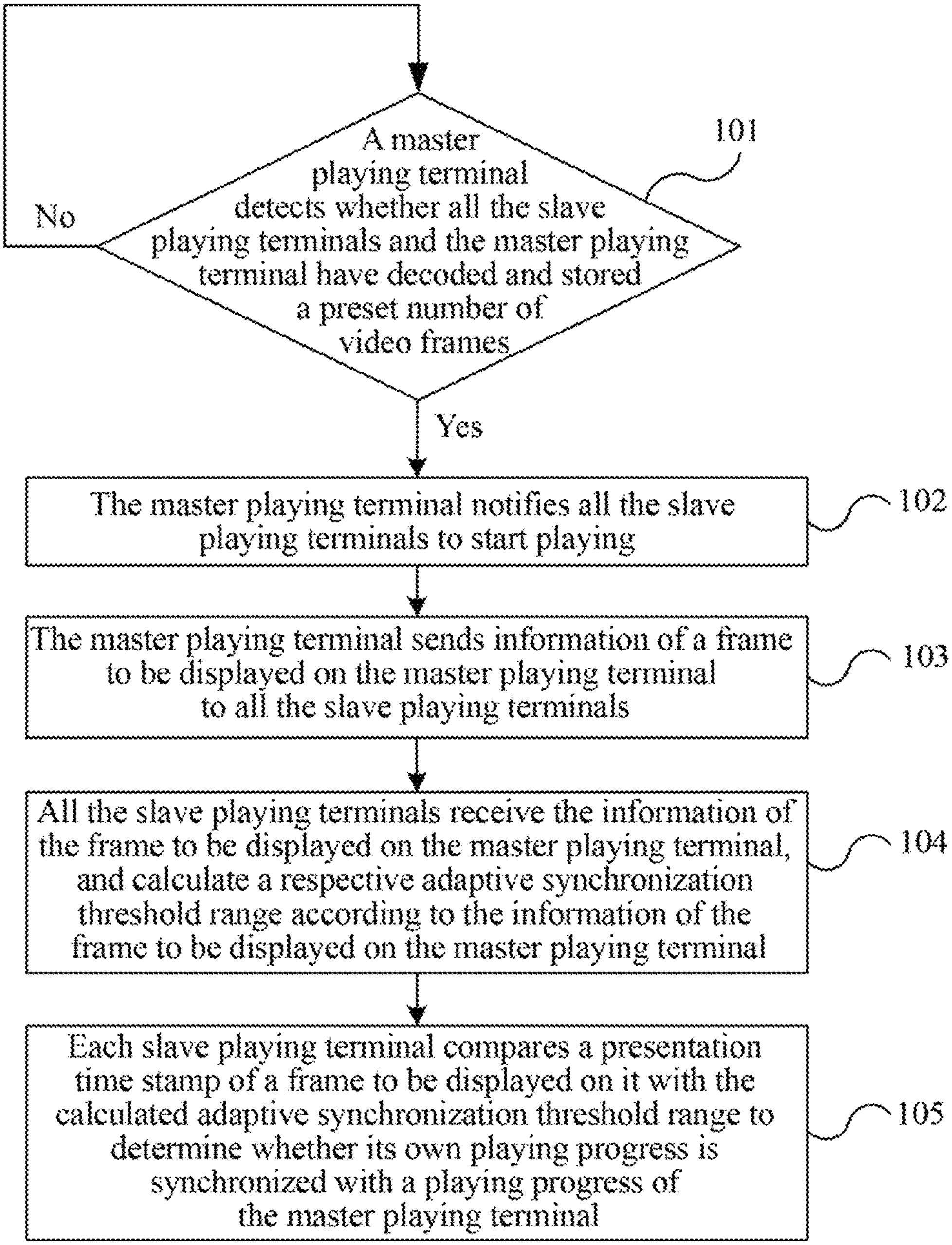
FIG. 1 is a schematic flowchart of a method for multi-screen video display according to an exemplary embodiment of the present disclosure.

The embodiments of the present disclosure will be described below with reference to the drawings in detail. Implementations may be implemented in multiple different forms. Those of ordinary skills in the art may easily understand such a fact that implementations and contents may be transformed into one or more forms without departing from the purpose and scope of the present disclosure. Therefore, the present disclosure should not be explained as being limited to the contents recorded in the following implementations only. The embodiments and features in the embodiments of the present disclosure may be randomly combined with each other if there is no conflict.

In the accompanying drawings, a size or sizes of one or more constituent elements, a thickness of a layer, or a region is sometimes exaggerated for clarity. Therefore, one implementation of the present disclosure is not necessarily limited to the dimensions, and shapes and sizes of a plurality of components in the accompanying drawings do not reflect actual scales. In addition, the accompanying drawings schematically illustrate ideal examples, and an implementation of the present disclosure is not limited to shapes, numerical values, or the like shown in the drawings.

Ordinal numerals such as "first", "second" and "third" in the present disclosure are set to avoid confusion between constituent elements, but not intended for restriction in quantity. "A plurality of" in the present disclosure means two or more in quantity.

As shown in FIG. 1, an embodiment of the present disclosure provides a method for multi-screen video display, including the following acts.

In act 101, a master playing terminal detects whether all slave playing terminals and the master playing terminal have decoded and stored a preset number of video frames.

In act 102, after detecting that all the slave playing terminals and the master playing in terminal have decoded and stored the preset number of video frames, the master playing terminal notifies all the slave playing terminals to start playing.

In act 103, the master playing terminal sends information of a frame to be displayed on the master playing terminal to all the slave playing terminal.

In act 104, each slave playing terminal receives the information of the frame to be displayed on the master playing terminal, and calculates an adaptive synchronization threshold range according to the information of the frame to be displayed on the master playing terminal.

In act 105, each slave playing terminal compares a presentation time stamp of its own frame to be displayed with the calculated adaptive synchronization threshold range to determine whether its own playing progress is synchronized with a playing progress of the master playing terminal.

For the method for multi-screen video display according to the embodiment of the present disclosure, by providing the master playing terminal and the slave playing terminals, the master playing terminal notifies the slave playing terminals to start playing, the slave playing terminal calculates the adaptive synchronization threshold range according to the information of the frame to be displayed on the master playing terminal, and determines whether its own playing process is synchronized with the playing progress of the master playing terminal according to the calculated adaptive synchronization threshold range, thus reducing the hardware cost, providing simple and flexible hardware installation and deployment, realizing the multi-screen video software synchronous playing and achieving the technical effect of high-quality multi-screen synchronous video display.

The method for multi-screen video display according to the embodiment of the disclosure is not only suitable for multi-screen video display of spliced screens, but also suitable for multi-screen video display in scenes such as traffic platforms, shopping malls, conferences, teaching and the like. In addition, the embodiment of the present disclosure does not limit the video content of the multi-screen display, and the video content of the multi-screen display may be consistent or inconsistent. For example, the method for multi-screen video display according to the embodiment of the present disclosure can be applied to the following two application scenarios: application scenario 1: when a multi-party conference is held, the screens at a plurality of conference sites simultaneously display the same video content; application scenario 2: different video contents are displayed on a plurality of spliced units of a large spliced screen.

In the embodiments of the present disclosure, there is usually only one master playing terminal, and one or more slave playing terminals. The master playing terminal may be designated by man or elected from a plurality of playing terminals through a preset election rule. For example, in some exemplary implementations, a playing terminal that first communicates with the server terminal may be designated in advance as the master playing terminal and the other playing terminals as the slave playing terminals. In some other exemplary embodiments, a playing terminal with the best hardware performance may be designated as the master playing terminal and the other playing terminal as the slave playing terminal. In some still other exemplary embodiments, the connection time between each two playing terminals of all playing terminals may be tested, the average connection time between each playing terminal and all other playing terminals may be calculated, and then a playing terminal having the shortest average connection time with all other playing terminals may be designated as the master playing terminal and the other playing terminals as slave playing terminals.

In some exemplary implementations, a server terminal may be provided for providing a video bit stream (which may be provided via a TCP/UDP transport protocol or another video transport protocol) to one or more playing terminals, and may also be provided for processing the video bit stream. For example, in order to adapt the display video to the display requirements of different playing terminals, the server terminal may perform real-time differentiated video processing/quality enhancement on local video or video stream, including changes in video attribute (resolution, dynamic range) and changes in video content (noise reduction, smoothing, sharpening and detail enhancement, etc.). By providing a server terminal, which performs processing/quality enhancement on the video content, the adaptability between the video and different playing terminals and the video display quality are improved, and various playing terminals are only responsible for playing, thus reducing the video processing cost.

In some other exemplary embodiments, the server terminal may not be provided, and the video may be stored in advance in the various playing terminals. For the method for multi-screen video display according to the embodiment of the present disclosure, the video synchronization between the master playing terminal and the slave playing terminals is realized through the message communication between the master playing terminal and the slave playing terminals, which does not limit the video transmission process. Before playing, the video may be issued to each playing terminal by the server terminal or downloaded by each playing terminal from the server terminal, or may be stored in each playing terminal in advance. After all the playing terminals prepare the video content, the method for multi-screen video display according to the embodiment of the disclosure is started to realize the multi-screen synchronous playing.

In some exemplary implementations, prior to act 101, the method further includes: the master playing terminal establishes communication connections with all the slave playing terminals.

In an embodiment of the present disclosure, the communication connections between the master playing terminal and all the slave playing terminals are established by the master playing terminal, so as to realize the subsequent playing initiation synchronous processing and the synchronization calibration processing in the playing process.

As an example, the master playing terminal may establish TCP communication connections with all the slave playing terminals through three handshakes of Transmission Control Protocol (TCP). In addition, the master playing terminal may establish User Datagram Protocol (UDP) multicast synchronization with all the slave playing terminals by creating a multicast group, binding the master playing terminal to a multicast address of the multicast group to which all the slave playing terminals belong through a socket, and sending a UDP synchronization message to the multicast address. The embodiment of the present disclosure may adopt a TCP/UDP thread and does not need to create an additional thread, to realize the method for multi-screen video display according to the embodiment of the present disclosure.

In some exemplary implementations, in act 101, the master playing terminal detects whether all the slave playing terminals have decoded and stored the preset number of video frames by detecting whether ready signals from all the slave playing terminals have been received.

In some exemplary implementations, ready signals from the slave playing terminals may be sent through the TCP protocol.

Figure 2:
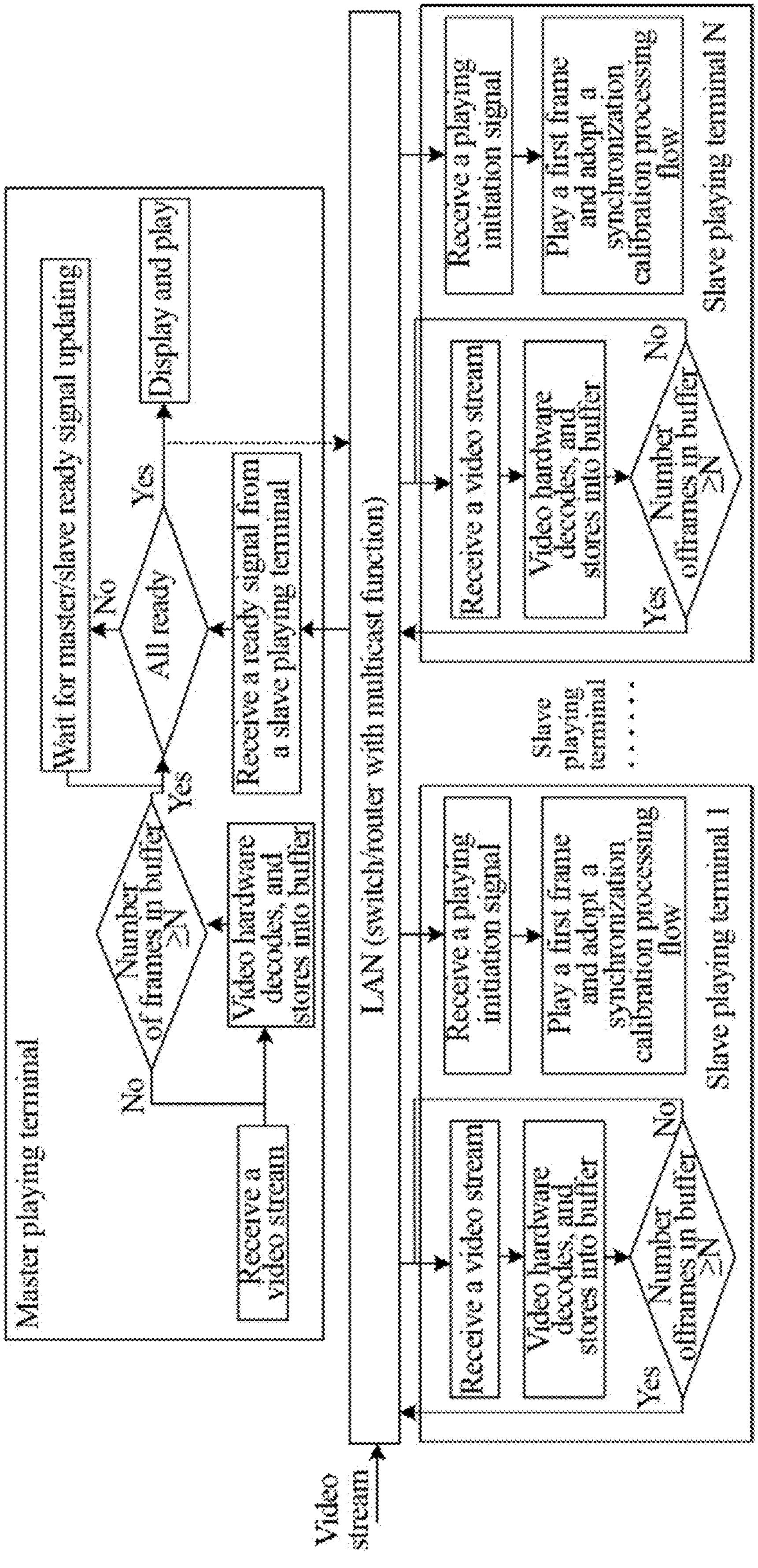
FIG. 2 is a schematic diagram of a playing initiation synchronization flow according to an exemplary embodiment of the present disclosure.

As an example, as shown in FIG. 2, both the master playing terminal and the slave playing terminals receive video streams from a network (which may be Local Area Network (LAN), Wireless Local Area Network (WLAN), etc.), decode them in sequence, and store them in their respective buffers. Each playing terminal detects whether its buffer reaches data of the preset number N of frames, and if so, the playing initiation preparation stage of the playing terminal is completed, and if not, the playing initiation preparation stage is not completed and the video stream is continued to be decoded. After the slave playing terminal is ready for playing initiation, the slave playing terminal will transmit the ready signal to the master playing terminal by the TCP protocol.

In some exemplary implementations, the preset number N may be 3 to 5.

In this embodiment, the preset number N should be smaller than the maximum buffer size of the playing terminal, so as to cope with the buffer data overflow problem caused by continuous decoding before the playing initiation signal is received. In this case, the preset number N should be selected to be neither too large nor too small. A too large N will cause that data of a large number of frames need to be decoded before playing initiation, resulting in too large delay of playing initiation. A too small N may cause that there is not enough buffer data for synchronization calibration when playing initiation is just started. Therefore, the preset number N is generally preferred as 3 to 5.

In some exemplary implementations, in act 102, the master playing terminal may notify all the slave playing terminals to start playing by sending a playing initiation signal to all the slave playing terminals.

In some exemplary implementations, the playing initiation signal of the master playing terminal may be sent through the UDP protocol (which may be UDP multicast or UDP broadcast).

The synchronization performance of multi-screen video playing is greatly affected by the playing initiation, and the asynchronous playing initiation of multi-playing terminal will directly cause the asynchronous viewing of video content by human eyes at different playing terminals. At the same time, it will greatly increase the number of times for synchronization calibration and error correction in the video playing process, thus bringing the phenomenon of frame skipping or waiting at the playing terminal due to synchronization calibration, which will damage the smooth of video playing at the corresponding playing terminal. Therefore, the playing initiation synchronization is of great significance.

In the embodiment of the present disclosure, the video playing initiation synchronization process may be divided into two stages: playing initiation preparation and playing initiation signal sending. After receiving the ready signals of all the slave playing terminals and storing N frames of decoded data in its buffer, the master playing terminal starts to play video frames and sends a playing initiation signal (which may be sent by multicast or broadcast as an example) to each slave playing terminal through UDP protocol. After the slave playing terminal receives the playing initiation signal, the slave playing terminal plays the first frame and performs the synchronization calibration by adopting the subsequent synchronization calibration processing flow, to ensure the playing synchronization of various playing terminals. Through the video playing initiation synchronization process, the video synchronization effect when playing initiation at multiple playing terminals is performed is realized, and the synchronization correction times during subsequent playing are reduced.

In some exemplary implementations, in act 103, the information of the frame to be displayed sent by the master playing terminal may include a frame type and a Presentation Time Stamp (PTS). As an example, the frame type includes an I frame, a P frame and a B frame.

I frame (intra picture), also called as intra coding frame, is usually the first frame of each Group of Pictures (GOP), which is moderately compressed and used as a reference point for random access, and may be regarded as an image. I frame may be regarded as the product of an image after compression, and it may be decompressed into a single and complete picture by a video decompression algorithm.

P frame (predictive-frame), also called as forward predictive coding frame, only uses forward time prediction, needs to refer to an I frame or P frame in front of it to generate a complete picture, which can improve compression efficiency and image quality.

B frame (bi-directional interpolated prediction frame), also called as bidirectional predictive interpolation coding frame, needs to refer to an I or P frame in front of it and a P frame behind it to generate a complete picture, which can greatly improve the compression ratio.

Decoding Time Stamp (DTS) is used to tell the playing terminal when to decode the data of this frame.

Presentation Time Stamp (PTS) is used to tell the playing terminal when to present the data of this frame. Although the DTS and PTS are used to instruct the behavior of the playing terminal, they are generated by the coder during coding.

In some exemplary implementations, in act 103, when the frame to be displayed on the master playing is an I frame, the method further includes: the master playing terminal sends a connection confirmation signal to all the slave playing terminals and receives feedback confirmation signals from all the slave playing terminals.

Figure 3:
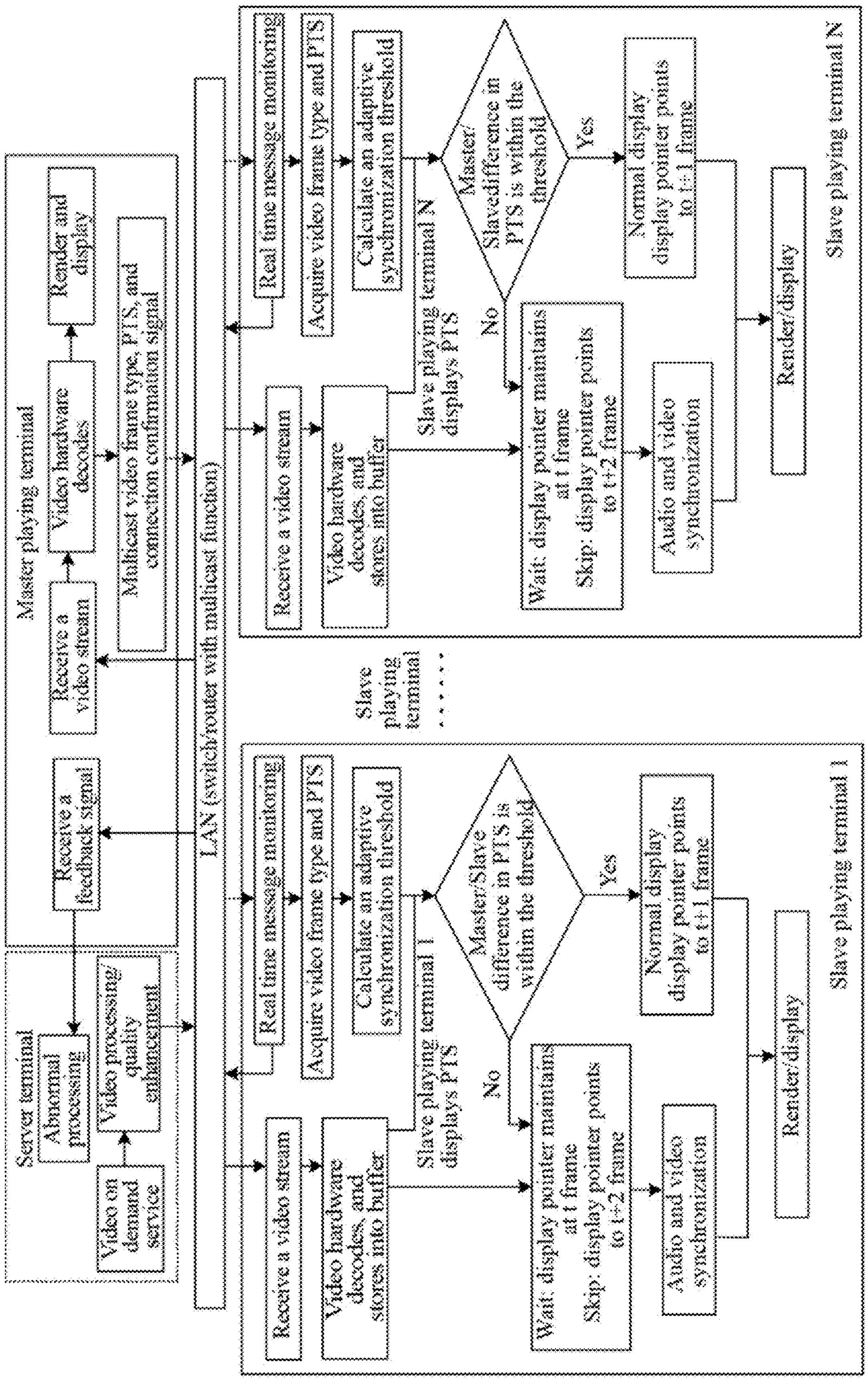
FIG. 3 is a schematic diagram of a synchronization calibration processing flow according to an exemplary embodiment of the present disclosure.

As shown in FIG. 3, the synchronization calibration processing flow according to an embodiment of the present disclosure is based on the video playing process of the master playing terminal, and the master playing terminal does less processing in the synchronization calibration processing flow, the slave playing terminals take the video playing process of the master playing terminal as a reference, and the synchronization process is mainly processed by the slave playing terminals to realize the playing synchronization with the master playing terminal, thus realizing the overall multi-screen synchronization calibration.

The embodiment of the present disclosure adopts a master-slave synchronization structure, which can discover the abnormal playing problem in time. The master playing terminal is in a dominant position in the whole synchronization link, and its playing process does not need to consider whether it is synchronized with other playing terminals, so its playing process is not affected by any slave playing terminal, and only needs to carry out UDP multicast or broadcast of the information of the frame to be displayed (video frame type, PTS information) to improve the overall real-time performance of the synchronization calibration mechanism, and notifies each slave playing terminal of the information of the frame to be displayed, so that each slave playing terminal carries out synchronization calibration. In order to deal with the problem of accidental disconnection of the playing terminals, when the master playing terminal plays the I frame, the master playing terminal synchronously multicasts the connection confirmation signal with the information of the frame to be displayed, and receives feedback confirmation signals from the slave playing terminals. When the master playing terminal receives the feedback confirmation signal from the same slave playing terminal for several continuous times or does not receive a feedback confirmation signal from a certain slave playing terminal within a predetermined time interval, the master playing terminal sends an error and abnormal code to the server terminal, but does not affect the existing playing process. The server terminal carries out corresponding abnormal processing according to the abnormal code, including but not limited to continuing playing, stopping playing and replaying.

The slave playing terminal monitors the information of the frame to be displayed sent from the master playing terminal in real time (for example, may use a Real Time Operation System (RTOS) or another monitoring mechanism), obtains the video frame type and PTS, and the connection confirmation signal. After the connection confirmation signal is received, a feedback confirmation signal is sent to the master playing terminal by using the TCP protocol.

In some exemplary implementations, in act 104, the adaptive synchronization threshold range=a presentation time stamp of the frame to be displayed on the master playing terminal+an average network transmission delay of the slave playing terminal+a frame type threshold range.

When the frame to be displayed on the master playing terminal is a non-I frame, the frame type threshold range is a first threshold range. When the frame to be displayed on the master playing terminal is an I frame, the frame type threshold range is a second threshold range, and the first threshold range is less than the second threshold range.

In some exemplary implementations, the first threshold range Basic may be calculated by the following formula:

$$\text{Basic} = \pm\alpha * \frac{1}{fps},$$

wherein, 0<α<1, fps is display time of one frame.

The second threshold range Thre_type may be calculated by the following formula:

$$\text{Thre\_type} = \beta * \text{Basic, wherein, } \beta > 1.$$

In the embodiment of the present disclosure, the slave playing terminal i adaptively calculates an adaptive synchronization threshold range $Thre_i$ of the slave playing terminal i based on the received video frame type of the frame to be displayed on the master playing terminal, the received PTS information of the frame to be displayed on the master playing terminal and its average network transmission delay $T_i$. By calculating the adaptive synchronization threshold range $Thre_i$ instead of a single threshold, the adaptability of synchronous playing threshold to video attribute, video frame attribute and network performance is improved.

Figure 4A:
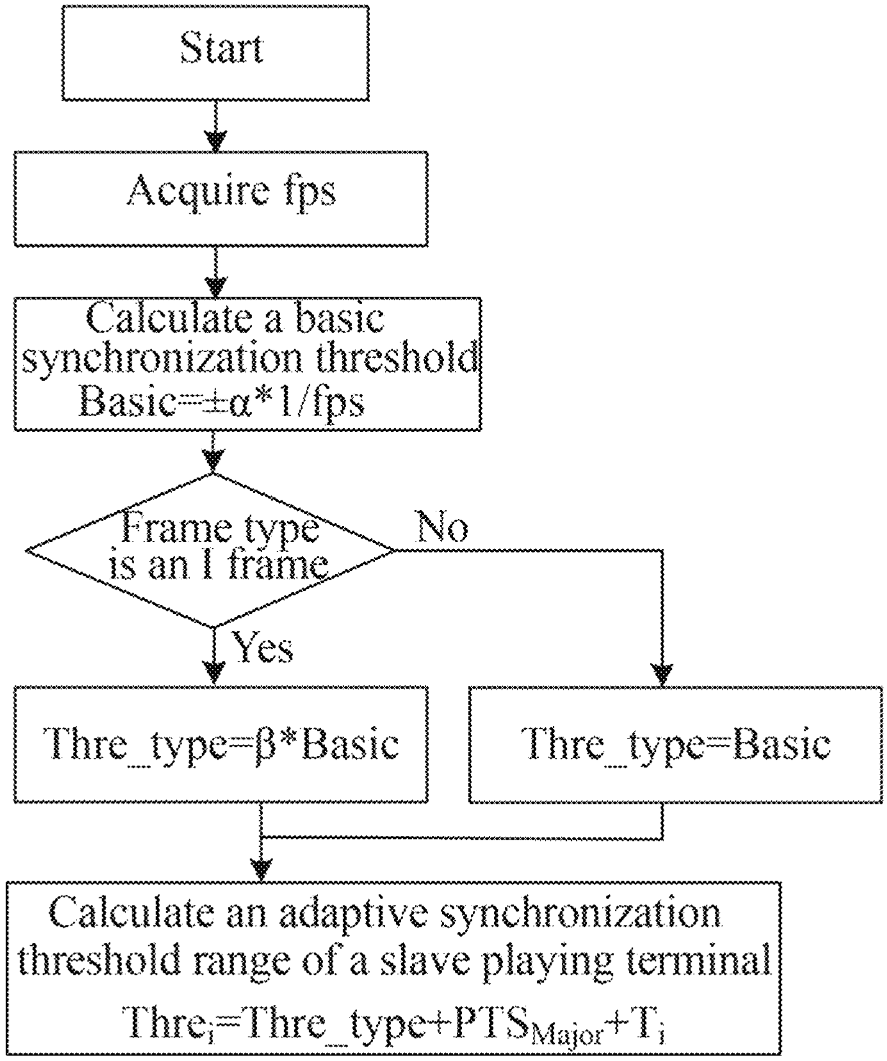
FIG. 4A is a flowchart for calculating an adaptive synchronization threshold range according to an exemplary embodiment of the present disclosure.

The adaptive synchronization threshold range $Thre_i$ of the embodiments of the present disclosure is determined according to the video attribute (frame rate, fps), video frame attributes (video frame type) and network transmission parameter (average network transmission delay). As shown in FIG. 4A, first, a basic synchronization threshold Basic is calculated using a video frame rate, seeing formula 1:

$$\text{Basic} = \pm\alpha * \frac{1}{fps} \quad \text{(formula 1)}$$

Where, $$\frac{1}{fps}$$

is display time of one frame, α is a first coefficient for controlling the synchronization interval, 0<α<1, for example, α=0.4. Since there are two possibilities of playing ahead and playing behind, the basic synchronization threshold Basic is ranged between $$-\alpha * \frac{1}{fps} \text{ and } \alpha * \frac{1}{fps}.$$

After the basic synchronization threshold Basic is determined, the frame type threshold range Thre_type is calculated according to the video frame type, seeing formula 2:

$$\text{Thre\_type} = \begin{cases} \beta * \text{Basic}, & \text{frame\_type} = I \\ \text{Basic}, & \text{frame\_type} \neq I \end{cases} \quad \text{(formula 2)}$$

Where, frame_type is the frame type, β is a second coefficient for controlling the I frame threshold expansion, β>1, for example, β=1.1. When the video frame is an I frame, compared with P/B frame, its data amount of a single frame is larger, the decoding time is longer, and the generated delay is higher than that of B frame and that of P frame, so it needs to give the I frame a larger synchronization error threshold. The multi-screen video synchronization method according to the embodiment of the present disclosure considers the influence of the I frame on the real-time performance of display, therefore, a larger frame type threshold range is provided for the I frame, to reduce the influence of the larger data amount of the I frame on the synchronization control system.

Finally, considering the influence of network transmission, the adaptive synchronization threshold range is calculated according to the frame type threshold range, the average network transmission delay and the PTS information of the frame to be displayed on the master playing terminal, and the method for calculating the adaptive synchronization threshold range $Thre_i$ of the slave playing terminal i may be seen from formula 3:

$$Thre_i = \text{Thre\_type} + PTS_{Major} + T_i \quad \text{(formula 3)}$$

Where, $PTS_{Major}$ is the PTS information of the frame to be displayed on the master playing terminal, $T_i$ is the average network transmission delay of the slave playing terminal i. After the connection between the master playing terminal and the slave playing terminal is established, the average network transmission delay $T_i$ of the slave playing terminal i is obtained by averaging the delays of multiple information communications between the master playing terminal and the slave playing terminal i.

In some exemplary implementations, when the presentation time stamp of a frame to be displayed on the slave playing terminal is outside the calculated adaptive synchronization threshold range, the slave playing terminal adjusts the playing progress thereof, including: when the presentation time stamp of the frame to be displayed on the slave playing terminal is less than a minimum value in the adaptive synchronization threshold range, the slave playing terminal plays a video frame picture of a skipped frame; and when the presentation time stamp of the frame to be displayed on the slave playing terminal is greater than a maximum value in the adaptive synchronization threshold range, the slave playing terminal maintains a video frame picture currently being played.

It is to determine whether the slave playing terminal is synchronized with the master playing terminal by determining whether the presentation time stamp of the frame to be displayed on the slave playing terminal is within the adaptive synchronization threshold value range obtained by the slave playing terminal. If it is in the adaptive synchronization threshold value range, the slave playing terminal plays normally. If it is not in the adaptive synchronization threshold range, and the presentation time stamp of the frame to be displayed on the slave playing terminal is less than the minimum value in the adaptive synchronization threshold range, it indicates that the slave playing terminal lags behind the master playing terminal and exceeds the allowable synchronization error range, the slave playing terminal skips the next frame which will be displayed if in a normal display and plays a picture of a skipped frame. If it is not in the adaptive synchronization threshold range, and the presentation time stamp of the frame to be displayed on the slave playing terminal is larger than the maximum value in the adaptive synchronization threshold range, it indicates that the slave playing terminal is ahead of the master playing terminal and exceeds the allowable synchronization error range, the slave playing terminal maintains displaying the video frame currently being played.

When the method for multi-screen video display according to the embodiment of the present disclosure is adopted to play a video synchronously, the synchronization error is small under the condition that the decoding computing power is sufficient and the playing initiation synchronization is adopted. In order to ensure the smooth and coherence of the picture during the synchronization calibration, only one frame may be skipped for each frame skipping. If the error is large or the synchronization control error is allowed to be large, more than one frame may be skipped once.

If the video file does not contain audio or subtitle files, the processing is completed. If there are audio or subtitle files in the video, the synchronization for audio and video and subtitle file display are carried out according to the presentation time stamp of the video frame. And finally, the synchronization calibration of all the slave playing terminals is realized, thus realizing the synchronous display of multi-screen video.

In some exemplary implementations, after act 105, when video playing is ended, the method further includes: the master playing terminal sends a playing termination signal to all the slave playing terminals and receives feedback termination signals from all the slave playing terminals.

As an example, when playing the last frame of the video (at this time, the video may be looped or switched to play another video), the master playing terminal sends a playing termination signal through UDP protocol (which may be sent by multicast or broadcast, for example), and the slave playing terminal sends a feedback termination signal to the master playing terminal by the TCP protocol and stops playing. After the master playing terminal receives feedback termination signals from all slave playing terminals, it starts to play a new video, so as to ensure that the display content of any of the slave playing terminals will not be missed and then re-playing is performed. Because UDP multicast signal has a certain packet loss risk, the master playing terminal will issue the playing termination signal for many times until it receives the feedback termination signals sent from all the slave playing terminals or issues the playing termination signal more than the maximum repetition times. If the times of issuing the playing termination signal exceeds the maximum repetition times, the master playing terminal will generate an alarm, report the abnormal connection of the client to the server terminal and wait for a new playing signal. In a normal flow, since looping or switching to play another video does not involve the changes in the number and connection of playing terminals, there is no need to re-establish the communication connections between the master playing terminal and the slave playing terminals compared with playing initiation.

Figure 4B:
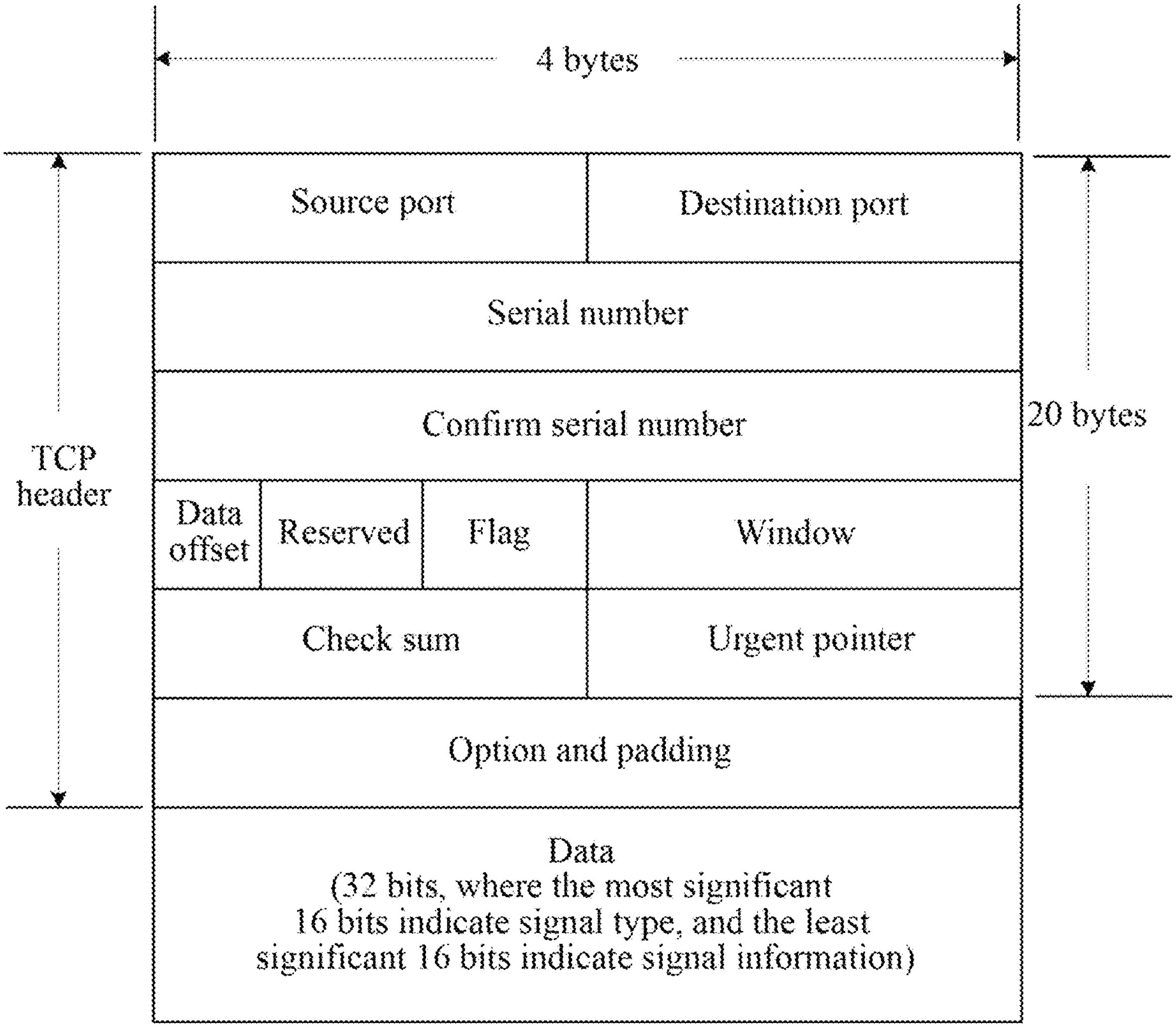
FIG. 4B is an exemplary TCP protocol packet structure.

FIG. 4B is an exemplary TCP protocol data packet structure. As shown in FIG. 4B, assuming that in the embodiment of the present disclosure, the data length of the TCP protocol on the application layer is 32 bits, wherein the most significant 16 bits may indicate the signal type, for example, 0000 may indicate the ready signal, the FFFF may indicate the feedback confirmation signal, and the least significant 16 bits may indicate preset signal information, for example, in the embodiment of the present disclosure, the least significant 16 bits may be designated as 0000.

Figure 4C:
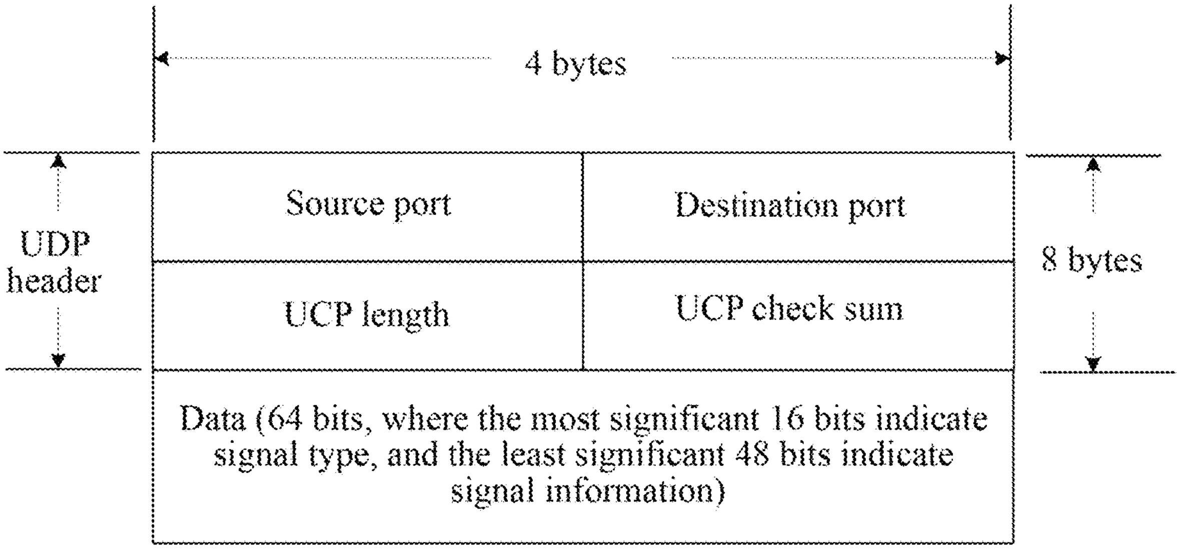
FIG. 4C is an exemplary UDP protocol packet structure.

FIG. 4C is an exemplary UDP protocol data packet structure. As shown in FIG. 4C, assuming that in the embodiment of the present disclosure, the data length of the UDP protocol on the application layer is 64 bits, wherein the most significant 16 bits may indicate the signal type, for example, 0000 may indicate the information broadcast of the frame to be displayed, FFFF may indicate the playing start notification, 00FF may indicate the connection confirmation signal+information broadcast of the frame to be displayed, and in the least significant 48 bits, 8 bits indicate the type of frame to be displayed (for example, FF indicates the type of frame to be displayed as I frame, F0 indicates the type of frame to be displayed as P frame, 0F indicates the type of frame to be displayed as B frame), 8 bits are reserved bits, and 32 bits indicate the presentation time stamp of the frame to be displayed.

Figure 5:
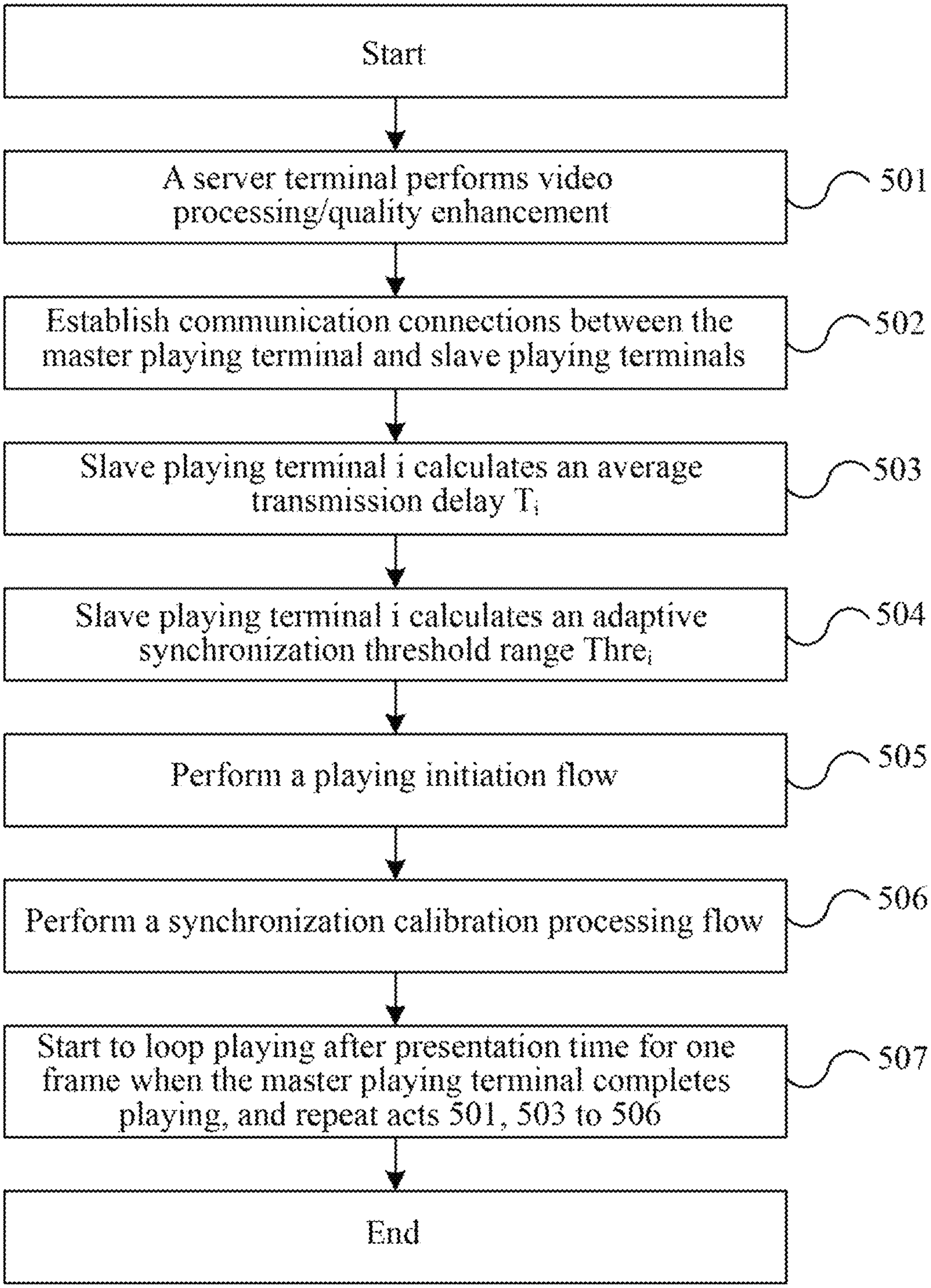
FIG. 5 is a schematic flowchart of another method for multi-screen video display according to an exemplary embodiment of the present disclosure.

The method for multi-screen video display of the embodiment of the present disclosure provides a software implementation method for multi-screen video synchronous display. As an example, the overall flow chart thereof may be as shown in FIG. 5, including the following acts.

In act 501, a server terminal performs video processing/quality enhancement on a video according to a playing requirement of a playing terminal.

In the embodiment of the present disclosure, the server terminal is mainly responsible for processing the video file and issuing the video file. The server terminal does not need to know the number of playing terminals. For multi-screen, the server terminal sends the video content to a multicast address, and the master playing terminal and the slave playing terminals pull the video stream of the required multicast address by themselves.

In act 502, a master playing terminal establishes a communication connection with one or more slave playing terminals to realize subsequent playing initiation and synchronous playing information processing.

In act 503, a slave playing terminal i uses an average delay of a plurality of information communications between the master playing terminal and the slave playing terminal i to calculate an average transmission delay $T_i$, and regards it as average transmission time in a current network condition.

In act 504, the slave playing terminal i adaptively calculates an adaptive synchronization threshold range $Thre_i$ at the slave playing terminal i according to a video attribute, a video frame type on the master playing terminal, and the average transmission delay $T_i$.

In act 505, a playing initiation flow is established, the master playing terminal sends a playing initiation signal to various slave play terminal through a UDP protocol to realize synchronization of playing initiation after the master playing terminal confirms that all playing terminals respectively decode N frames and store them in buffers.

In act 506, a synchronize calibrate processing flow is performed, the master playing terminal multicasts a video frame type and PTS to be rendered after decoding, and each slave playing terminal detects whether the video playing is synchronized according to its own adaptive synchronization threshold range; if it is synchronized, the slave playing terminal will play normally; if the slave playing terminal lags behind, it adopts a way of frame skipping to catch up; and if the slave playing terminal is ahead, it waits and performs audio and video synchronization processing.

In act 507, when the master playing terminal loops or switches to play another video, the master playing terminal sends a playing termination signal, and the slave playing terminal sends a feedback termination signal and stops playing, and after the master playing terminal receives feedback termination signals from all the slave playing terminals, the master playing terminal repeats acts 501 and 503 to 506, so as to ensure that the display content of any slave playing terminal will not be missed, and then the playing terminal loops or switches to play another video (when the master playing terminal and the slave playing terminals do not change, there is no need to re-establish the communication connections between the master playing terminal and the slave playing terminals).

In the method for multi-screen video display according to the embodiment of the present disclosure, the adaptability of the video and different playing terminals and the video display quality are improved through the video processing/quality enhancement of the server terminal. Through the playing initiation synchronization technology, the master playing terminal and the slave playing terminals are designed, the synchronization information of the master playing terminal is broadcast or multicast through UDP so as to solve the video synchronization effect upon the playing initiation of a plurality of playing terminals, thus reducing the number of times for the synchronization correction when subsequent playing. Through the calculation of adaptive synchronization threshold range, the adaptability of synchronous playing threshold to video attribute, video frame attribute and network performance is improved, instead of a single threshold. Through the synchronization calibration processing flow of the master playing terminal and the slave playing terminals, the master-slave relationship is adopted to solve the multi-screen video asynchronous problem in the video playing process. The mechanism of detecting the status of slave playing terminals in the playing process is designed, therefore, abnormal playing problems can be discovered in time although the master and slave synchronous structure is adopted. Based on the termination information communication of master and slave playing terminals, looping, switching to play another video, and reporting issues in synchronous playing are carried out.

The actual test shows that, using the method for multi-screen video display according to the embodiment of the present disclosure, the synchronization error of two playing terminals is below 20 ms, the synchronization error of three or more playing terminals is below 40 ms, and the test result thereof is 30 ms. The video stream is encoded in H.264 or H.265, and the image quality is generally consistent.

Figure 6:
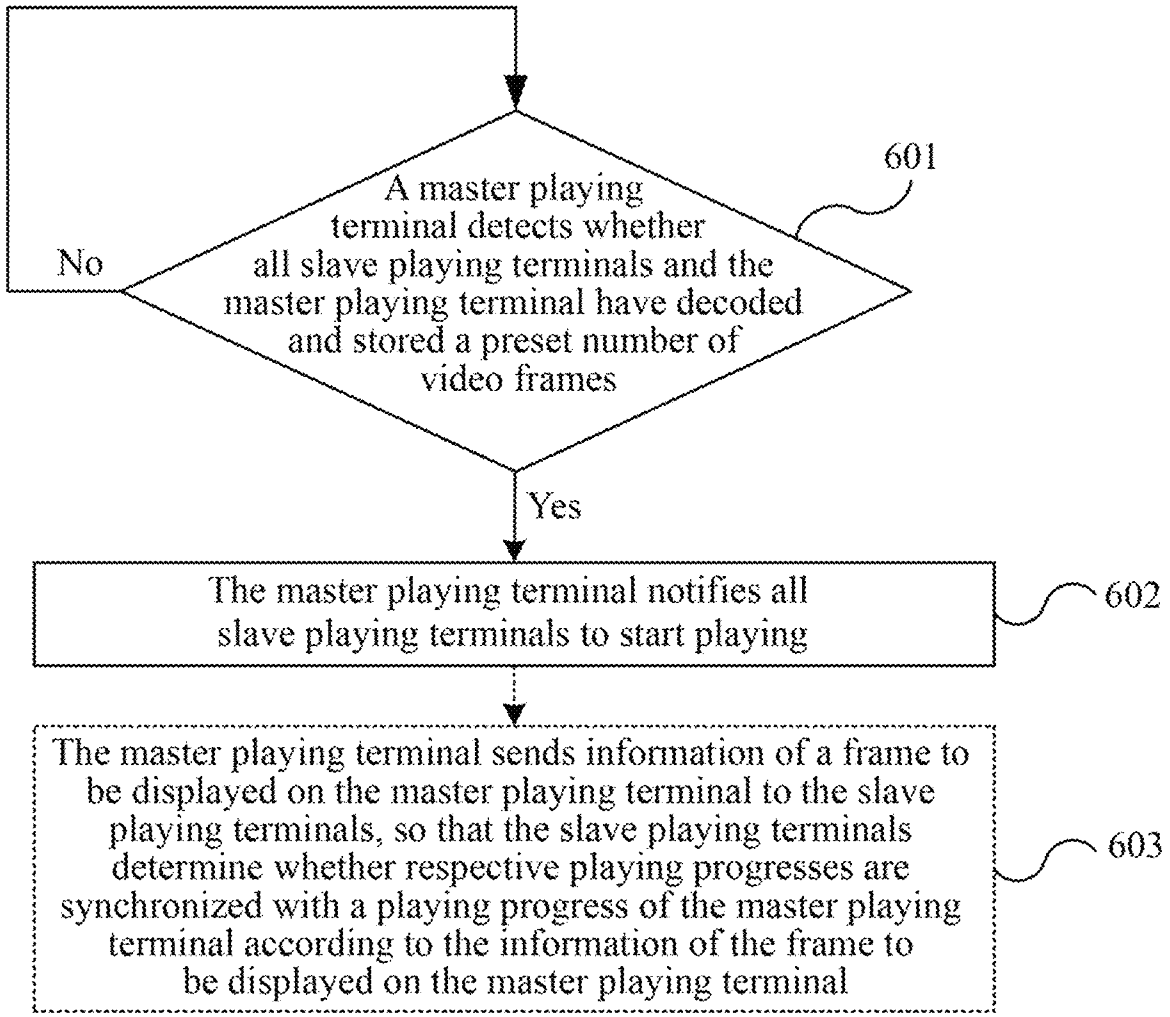
FIG. 6 is a schematic flowchart of yet another method for multi-screen video display according to an exemplary embodiment of the present disclosure.

As shown in FIG. 6, an embodiment of the present disclosure also provides a method for multi-screen video display, which includes the following acts.

In act 601, a master playing terminal detects whether all slave playing terminals and the master playing terminal have decoded and stored a preset number of video frames.

In act 602, after detecting that all the slave playing terminals and the master playing terminal have decoded and stored the preset number of video frames, the master playing terminal notifies all the slave playing terminals to start playing.

The method for multi-screen video display according to the embodiment of the disclosure is not only suitable for multi-screen video display of spliced screens, but also suitable for multi-screen video display in scenes such as traffic platforms, shopping malls, conferences, teaching and the like. In addition, the embodiment of the present disclosure does not limit the video content of the multi-screen display, and the video content of the multi-screen display may be consistent or inconsistent. For example, application scenario 1: when a multi-party conference is held, the screens at a plurality of conference sites simultaneously display the same video content; application scenario 2: different video contents are displayed on a plurality of spliced units of a large spliced screen.

In the embodiments of the present disclosure, there is usually only one master playing terminal, and one or more slave playing terminals. The master playing terminal may be designated by man or elected from a plurality of playing terminals through a preset election rule. For example, in some exemplary implementations, a playing terminal that first communicates with the server terminal may be designated in advance as the master playing terminal and the other playing terminals as the slave playing terminals. In some other exemplary embodiments, a playing terminal with the best hardware performance may be designated as the master playing terminal and the other playing terminal as the slave playing terminal. In some still other exemplary embodiments, the connection time between each two playing terminals of all playing terminals may be tested, the average connection time between each playing terminal and all other playing terminals may be calculated, and then a playing terminal having the shortest average connection time with all other playing terminals may be designated as the master playing terminal and the other playing terminals as slave playing terminals.

In some exemplary implementations, a server terminal may be provided for providing a video bit stream (which may be provided via a TCP/UDP transport protocol or another video transport protocol) to one or more playing terminals, and may also be provided for processing the video bit stream. For example, in order to adapt the display video to the display requirements of different playing terminals, the server terminal may perform real-time differentiated video processing/quality enhancement on local video or video stream, including changes in video attribute (resolution, dynamic range) and changes in video content (noise reduction, smoothing, sharpening and detail enhancement, etc.). By providing a server terminal, which performs processing/quality enhancement on the video content, the adaptability between the video and different playing terminals and the video display quality are improved, and various playing terminals are only responsible for playing, thus reducing the video processing cost.

In some other exemplary embodiments, the server terminal may not be provided, and the video may be stored in advance in the various playing terminals. For the method for multi-screen video display according to the embodiment of the present disclosure, the video synchronization between the master playing terminal and the slave playing terminals is realized through the message communication between the master playing terminal and the slave playing terminals, which does not limit the video transmission process. Before playing, the video may be issued to each playing terminal by the server terminal or downloaded by each playing terminal from the server terminal, or may be stored in each playing terminal in advance. After all the playing terminals prepare the video content, the method for multi-screen video display according to the embodiment of the disclosure is started to realize the multi-screen synchronous playing.

In some exemplary implementations, the method further includes the act 603.

In act 603, the master playing terminal sends information of a frame to be displayed on the master playing terminal to the slave playing terminals, so that the slave playing terminals determine whether their respective playing progresses are synchronized with a playing progress of the master playing terminal according to the information of the frame to be displayed on the master playing terminal.

For the method for multi-screen video display according to the embodiment of the present disclosure, by providing the master playing terminal and the slave playing terminals, the master playing terminal notifies the slave playing terminals to start playing, the slave playing terminal calculates the adaptive synchronization threshold range according to the information of the frame to be displayed on the master playing terminal, and determines whether its own playing process is synchronized with the playing progress of the master playing terminal according to the calculated adaptive synchronization threshold range, thus reducing the hardware cost, providing simple and flexible hardware installation and deployment, realizing the multi-screen video software synchronous playing and achieving the technical effect of high-quality multi-screen synchronous video display.

In some exemplary implementations, prior to the act 601, the method further includes: the master playing terminal establishes communication connections with all the slave playing terminals.

In an embodiment of the present disclosure, the communication connections between the master playing terminal and all the slave playing terminals are established by the master playing terminal, so as to realize the subsequent playing initiation synchronous processing and the synchronization calibration processing in the playing process.

As an example, the master playing terminal establishes TCP communication connections with all the slave playing terminals through three handshakes of the TCP. In addition, the master playing terminal establishes UDP multicast synchronization with all the slave playing terminals by creating a multicast group, binding the master playing terminal to a multicast address of the multicast group to which all the slave playing terminals belong through a socket, and sending a UDP synchronization message to the multicast address. The embodiment of the present disclosure may adopt a TCP/UDP thread and does not need to create an additional thread, to realize the method for multi-screen video display according to the embodiment of the present disclosure.

In some exemplary implementations, in act 601, the master playing terminal detects whether all the slave playing terminals have decoded and stored a preset number of video frames by detecting whether ready signals from all the slave playing terminals have been received.

In some exemplary implementations, ready signals from the slave playing terminals may be sent through the TCP protocol.

As an example, as shown in FIG. 2, both the master playing terminal and the slave playing terminals receive video streams from a network (which may be Local Area Network (LAN), Wireless Local Area Network (WLAN), etc.), decode them in sequence, and store them in their respective buffers. Each playing terminal detects whether its buffer reaches data of the preset number N of frames, if so, the playing initiation preparation stage of the playing terminal is completed, and if not, the playing initiation preparation stage is not completed and the video stream is continued to be decoded. After the slave playing terminal is ready for playing initiation, the slave playing terminal will transmit the ready signal to the master playing terminal by TCP protocol.

In some exemplary implementations, the preset number N may be 3 to 5.

In this embodiment, the preset number N should be smaller than the maximum buffer size of the playing terminal, so as to cope with the buffer data overflow problem caused by continuous decoding before the playing initiation signal is received. At the same time, for the selection of the preset number N, the preset number N should not be too large or too small. A too large N will cause that data of a large number of frames need to to be decoded before playing initiation, resulting in too large delay of playing initiation. A too small N may cause that there is not enough buffer data for synchronization calibration when playing initiation is just started. Therefore, the preset number N is generally preferred as 3 to 5.

In some exemplary implementations, in act 602, the master playing terminal may notify all the slave playing terminals to start playing by sending a playing initiation signal to all the slave playing terminals.

In some exemplary implementations, the playing initiation signal of the master playing terminal may be sent through the UDP protocol (which may be UDP multicast or UDP broadcast).

The synchronization performance of multi-screen video playing is greatly affected by the playing initiation, and the asynchronous playing initiation of multi-playing terminal will directly cause the asynchronous viewing of video content by human eyes at different playing terminals. At the same time, it will greatly increase the number of times for synchronization calibration and error correction in the video playing process, thus bringing the phenomenon of frame skipping or waiting at the playing terminal due to synchronization calibration, which will damage the smooth of video playing at the corresponding playing terminal. Therefore, the playing initiation synchronization is of great significance.

In the embodiment of the present disclosure, the synchronization process for video playing initiation may be divided into two stages: playing initiation preparation and playing initiation signal sending. After receiving the ready signals of all the slave playing terminals and storing N frames of decoded data in its buffer, the master playing terminal starts to play video frames and sends a playing initiation signal (which may be sent by multicast or broadcast as an example) to each slave playing terminal through UDP protocol. After the slave playing terminal receives the playing initiation signal, the first frame is played and the synchronization calibration is carried out by adopting the subsequent synchronization calibration processing flow to ensure the playing synchronization of various playing terminals. Through the synchronization process of video playing initiation, the video synchronization effect when playing initiation at multiple playing terminals is performed is realized, and the synchronization correction times during subsequent playing are reduced.

In some exemplary implementations, in act 603, the information of the frame to be displayed sent by the master playing terminal may include a frame type and a Presentation Time Stamp (PTS). As an example, the frame type includes an I frame, a P frame and a B frame.

In some exemplary implementations, in act 603, when the frame to be displayed on the master playing is an I frame, the method further includes: the master playing terminal sends connection confirmation signals to all the slave playing terminals and receives feedback confirmation signals from all the slave playing terminals.

As shown in FIG. 3, the synchronization calibration processing flow according to an embodiment of the present disclosure is based on the video playing process of the master playing terminal, and the master playing terminal does less processing in the synchronization calibration processing flow, the slave playing terminals take the video playing process of the master playing terminal as a reference, and the synchronization process is mainly processed by the slave playing terminals to realize the playing synchronization with the master playing terminal, thus realizing the overall multi-screen synchronization calibration.

The embodiments of the present disclosure adopt a master-slave synchronization structure, which can discover the abnormal playing problem in time. The master playing terminal is in a dominant position in the whole synchronization link, and its playing process does not need to consider whether it is synchronized with other playing terminals, so its playing process is not affected by any slave playing terminal, and only needs to carry out UDP multicast or broadcast of the information of the frame to be displayed (video frame type, PTS information) to improve the real-time performance of the whole synchronization calibration mechanism, and notifies each slave playing terminal of the information of the frame to be displayed, so that each slave playing terminal carries out synchronization calibration. In order to deal with the problem of accidental disconnection of the playing terminal, when the master playing terminal plays the I frame, the master playing terminal synchronously multicasts the connection confirmation signal with the information of the frame to be displayed, and receives feedback confirmation signals from the slave playing terminals. When the master playing terminal receives the feedback confirmation signal from the same slave playing terminal for several continuous times or does not receive a feedback confirmation signal from a certain slave playing terminal within a predetermined time interval, the master playing terminal sends an error and abnormal code to the server terminal, but does not affect the existing playing process. The server terminal carries out corresponding abnormal processing according to the abnormal code, including but not limited to continuing playing, stopping playing and replaying.

The slave playing terminal monitors the information of the frame to be displayed sent from the master playing terminal in real time (for example, may use a Real Time Operation System (RTOS)), obtains the video frame type and PTS, and the connection confirmation signal. After receiving the connection confirmation signal, a feedback confirmation signal is sent to the master playing terminal by using the TCP protocol.

In some exemplary implementations, after act 603, when video playing is ended, the method further includes: the master playing terminal sends a playing termination signal to all the slave playing terminals and receives feedback termination signals from all the slave playing terminals.

As an example, when playing the last frame of the video (at this time, the video may be looped or switched to play another video), the master playing terminal sends a playing termination signal through UDP protocol (which may be sent by multicast or broadcast, for example), and the slave playing terminal sends a feedback termination signal to the master playing terminal by the TCP protocol and stops playing. After the master playing terminal receives feedback termination signals from all the slave playing terminals, it starts to play a new video, so as to ensure that the display content of any of the slave playing terminals will not be missed and then re-playing is performed. Because UDP multicast signal has a certain packet loss risk, the master playing terminal will issue the playing termination signal for many times until it receives the feedback termination signals sent from all the slave playing terminals or issues the playing termination signal more than the maximum repetition times. If the times of issuing the playing termination signal exceeds the maximum repetition times, the master playing terminal will generate an alarm, report the abnormal connection of the client to the server terminal and wait for a new playing signal. In a normal flow, since looping or switching to play another video does not involve the changes in the number and connection of playing terminals, there is no need to re-establish the communication connections between the master playing terminal and the slave playing terminals compared with playing initiation.

An embodiment of the present disclosure also provides a playing terminal, which includes: a memory, and a processor coupled to the memory, wherein the processor is configured to perform acts of the method for multi-screen video display as described in any embodiment of the present disclosure based on instructions stored in the memory.

Figure 7:
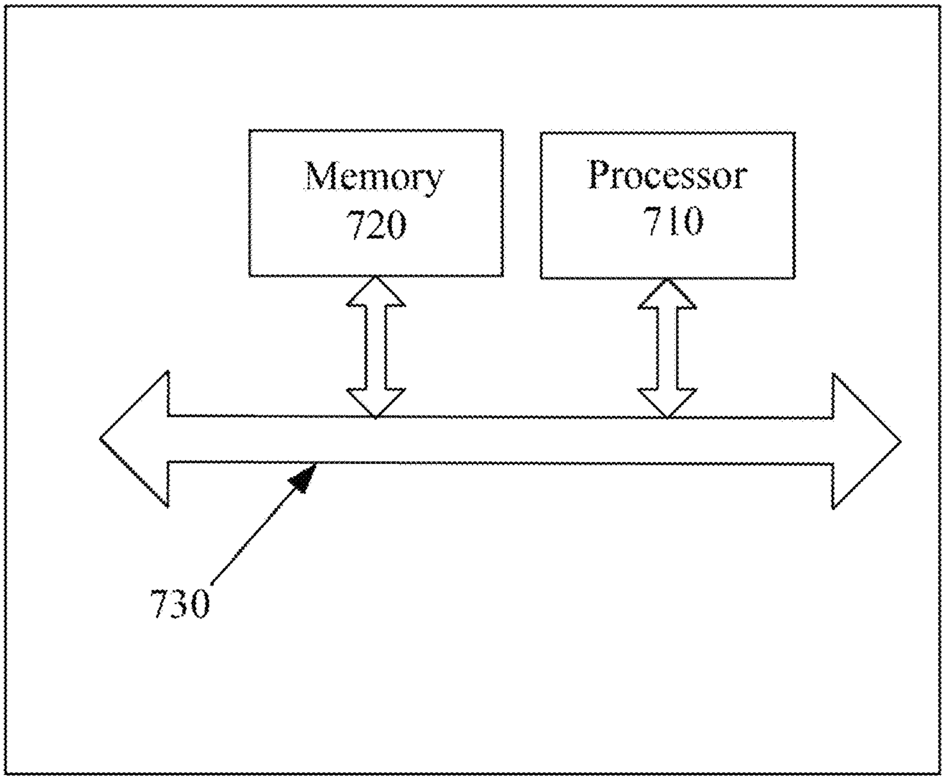
FIG. 7 is a schematic diagram of a structure of a playing terminal according to an exemplary embodiment of the present disclosure.

As shown in FIG. 7, in one example, the playing terminal may include a processor 710, a memory 720, and a bus system 730. The processor 710 and the memory 720 are connected via the bus system 730, the memory 720 is configured to store instructions, the processor 710 is configured to execute the instructions stored by the memory 720 to implement the method for multi-screen video display as described in any embodiment of the present disclosure.

It should be understood that the processor 710 may be a Central Processing Unit (CPU), or the processor 710 may be another general-purpose processor, a Digital Signal Processor (DSP), an Application Specific Integrated Circuit (ASIC), a Field Programmable Gate Array (FPGA), or another programmable logic device, a discrete gate or a transistor logic device, a discrete hardware component, etc. The general-purpose processor may be a microprocessor, or the processor may be any conventional processor, etc.

The memory 720 may include a read only memory and a random access memory, and provides instructions and data to the processor 710. A portion of the memory 720 may further include a non-volatile random access memory. For example, the memory 720 may also store information of a device type.

The bus system 730 may include a power bus, a control bus, a status signal bus, or the like in addition to a data bus. However, for clarity of illustration, various buses are all denoted as the bus system 730 in FIG. 7.

In an implementation process, processing performed by a processing device may be completed through an integrated logic circuit of hardware in the processor 710 or instructions in a form of software. That is, acts of the method in the embodiments of the present disclosure may be embodied as executed and completed by a hardware processor, or executed and completed by a combination of hardware in the processor and a software module. The software module may be located in a storage medium such as a random access memory, a flash memory, a read only memory, a programmable read-only memory or an electrically erasable programmable memory, or a register, etc. The storage medium is in the memory 720, and the processor 710 reads information in the memory 720 and implements the acts in the above method in combination with its hardware. In order to avoid repetition, detailed description is not repeated here.

An embodiment of the present disclosure also provides a storage medium on which a computer program is stored, and when the program is executed by the processor, the method for multi-screen video display as described in any embodiment of the present disclosure is implemented.

In some possible embodiments, aspects of the method for multi-screen video display provided by the present application may also be implemented in the form of a program product, which includes a program code. When the program product is run on a computer device, the program code is used to enable the computer device to perform the acts in the method for multi-screen video display according to various exemplary embodiments of the present application as described in this specification. For example, the computer device may perform the method for multi-screen video display described in the embodiments of the present application.

For the program product, any combination of one or more readable media may be used. The readable medium may be a readable signal medium or a readable storage medium. The readable storage medium may be, for example, but is not limited to, an electrical, magnetic, optical, electromagnetic, infrared, or semiconductor system, apparatus, or device, or a combination of any of the above. More specific examples (non-exhaustive list) of the readable storage medium include: an electrical connection with one or more wires, a portable disk, a hard disk, a Random Access Memory (RAM), a Read-only Memory (ROM), an Erasable Programmable Read-only Memory (EPROM or flash memory), an optical fiber, a portable Compact Disk Read-only Memory (CD-ROM), an optical storage device, a magnetic storage device, or any suitable combination of the above.

Figure 8:
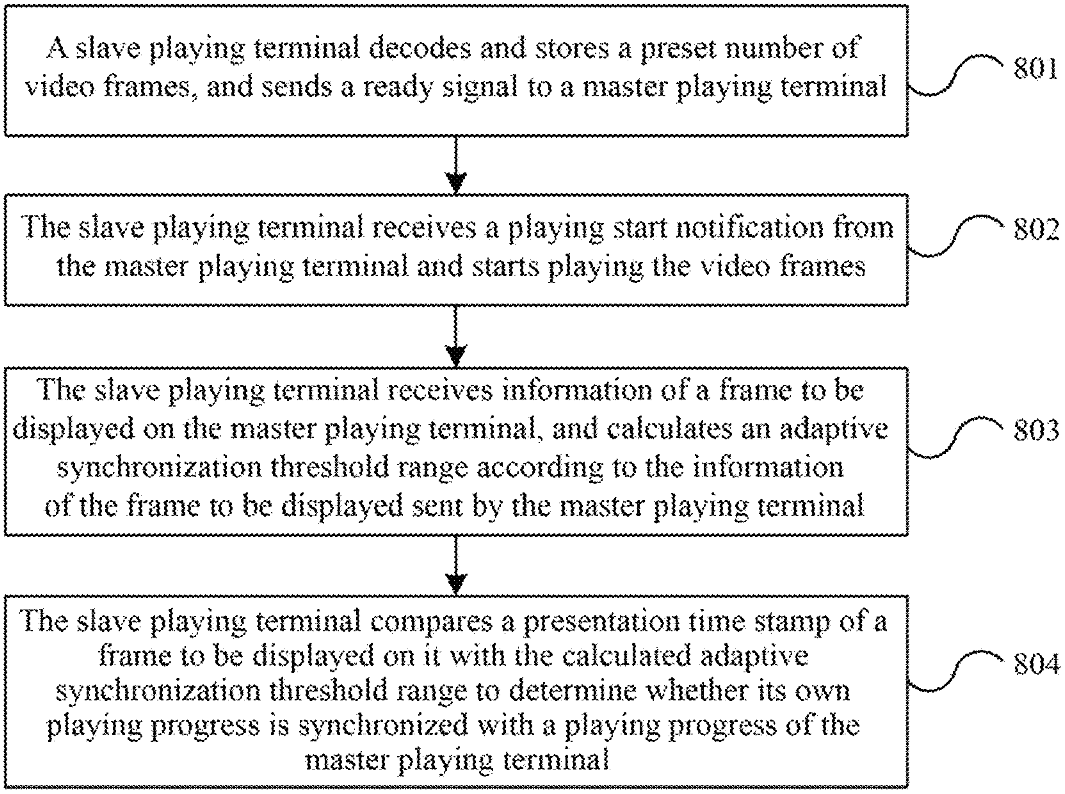
FIG. 8 is a schematic flowchart of still yet another method for multi-screen video display according to an exemplary embodiment of the present disclosure.

As shown in FIG. 8, an embodiment of the present disclosure also provides a method for multi-screen video display, which includes the following acts.

In act 801, a slave playing terminal decodes and stores a preset number of video frames, and sends a ready signal to a master playing terminal.

In act 802, the slave playing terminal receives a playing start notification from the master playing terminal and starts playing video frames.

In act 803, the slave playing terminal receives information of a frame to be displayed on the master playing terminal, and calculates an adaptive synchronization threshold range according to the information of the frame to be displayed sent by the master playing terminal.

In act 804, the slave playing terminal compares a presentation time stamp of a frame to be displayed on it with the calculated adaptive synchronization threshold range to determine whether its own playing progress is synchronized with a playing progress of the master playing terminal.

In some exemplary implementations, in act 803, the adaptive synchronization threshold range=a presentation time stamp of the frame to be displayed sent by the master playing terminal+an average network transmission delay of the slave playing terminal+a frame type threshold range.

When the frame to be displayed on the master playing terminal is a non-I frame, the frame type threshold range is a first threshold range. When the frame to be displayed on the master playing terminal is an I frame, the frame type threshold range is a second threshold range, and the first threshold range is less than the second threshold range.

In some exemplary implementations, the first threshold range Basic may be calculated by the following formula:

$$\text{Basic} = \pm\alpha * \frac{1}{fps},$$

wherein, 0<α<1, fps is display time of one frame.

The second threshold rangeThre_type may be calculated by the following formula:

$$\text{Thre\_type} = \beta * \text{Basic, wherein, } \beta > 1.$$

In the embodiment of the present disclosure, the slave playing terminal i may adaptively calculate an adaptive synchronization threshold range $\text{Thre}_i$ of the slave playing terminal $T_i$ according to the received video frame type and PTS information (i.e., presentation time stamp) of the frame to be displayed on the master playing terminal and the average network transmission delay $T_i$ of the slave playing terminal, wherein i is a natural number.

The adaptive synchronization threshold range $\text{Thre}_i$ of the embodiments of the present disclosure is determined according to video attribute (frame rate, fps), video frame attribute (video frame type) and network transmission parameter (average network transmission delay). As shown in FIG. 4A, first, a basic synchronization threshold Basic is calculated using a video frame rate, seeing formula 1:

$$\text{Basic} = \pm\alpha * \frac{1}{fps} \quad \text{(formula 1)}$$

Where, 1/fps is display time of one frame, a is a first coefficient for controlling the fps synchronization interval, 0<α<1, for example, α=0.4. Since there are two possibilities of playing ahead and playing behind, the basic synchronization threshold Basic is ranged between $$-\alpha * \frac{1}{fps} \text{ and } \alpha * \frac{1}{fps}.$$

After the basic synchronization threshold Basic is determined, the frame type threshold range Thre_type is calculated according to the video frame type, seeing formula 2:

$$\text{Thre\_type} = \begin{cases} \beta * \text{Basic}, & \text{frame\_type} = I \\ \text{Basic}, & \text{frame\_type} \neq I \end{cases} \quad \text{(formula 2)}$$

Where, frame_type is the frame type, β is a second coefficient for controlling the I frame threshold expansion, β>1, for example, β=1.1. When the video frame is an I frame, compared with the P/B frame, its data amount of a single frame is larger, the decoding time is longer, and the generated delay is higher than that of B frame and that of P frame, so it needs to give the I frame a larger synchronization error threshold. The multi-screen video synchronization method according to the embodiment of the present disclosure considers the influence of the I frame on the real-time performance of display, therefore, a larger frame type threshold range is provided for the I frame, to reduce the influence of the larger data amount of the I frame on the synchronization control system.

Finally, considering the influence of network transmission, the adaptive synchronization threshold range is calculated according to the frame type threshold range, the average network transmission delay and the PTS of the frame to be displayed on the master playing terminal, and the method for calculating the adaptive synchronization threshold range $\text{Thre}_i$ of the slave playing terminali may be seen from formula 3:

$$Thre_i = \text{Thre\_type} + PTS_{Major} + T_i \quad \text{(formula 3)}$$

Where, $\text{PTS}_{Major}$ is the PTS of the frame to be displayed on the master playing terminal, $T_i$ is the average network transmission delay of the slave playing terminal i. After the connection between the master playing terminal and the slave playing terminal is established, the average network transmission delay $T_i$ of the slave playing terminal is obtained by averaging the delays of multiple information communications between the master playing terminal and the slave playing terminal i.

In some exemplary implementations, in act 804, when the presentation time stamp of the frame to be displayed on the slave playing terminal is outside the calculated adaptive synchronization threshold range, the slave playing terminal determines that its own playing progress is not synchronized with the playing progress of the master playing terminal. In this case, an alarm may be displayed on the server terminal or slave playing terminal on one hand, and the slave playing terminal may also adjust its own playing progress on the other hand.

Adjusting, by the slave playing terminal, its own playing progress, includes: when the presentation time stamp of the frame to be displayed on the slave playing terminal is less than a minimum value in the adaptive synchronization threshold range, the slave playing terminal plays a video frame picture of a skipped frame; and when the presentation time stamp of the frame to be displayed on the slave playing terminal is greater than a maximum value in the adaptive synchronization threshold range, the slave playing terminal maintains a video frame picture currently being played.

It is to determine whether the slave playing terminal is synchronized with the master playing terminal by determining whether the presentation time stamp of the frame to be displayed on the slave playing terminal is within the adaptive synchronization threshold value range obtained by the slave playing terminal. If it is in the adaptive synchronization threshold value range, the slave playing terminal plays normally. If it is not in the adaptive synchronization threshold range, and the presentation time stamp of the frame to be displayed on the slave playing terminal is less than the minimum value in the adaptive synchronization threshold range, it indicates that the slave playing terminal lags behind the master playing terminal and exceeds the allowable synchronization error range, the slave playing terminal skips the next frame which will be displayed if in a normal display and plays a picture of a skipped frame. If it is not in the adaptive synchronization threshold range, and the presentation time stamp of the frame to be displayed on the slave playing terminal is larger than the maximum value in the adaptive synchronization threshold range, it indicates that the slave playing terminal is ahead of the master playing terminal and exceeds the allowable synchronization error range, the slave playing terminal maintains to display the video frame currently being played.

When the method for multi-screen video display according to the embodiment of the present disclosure is adopted to play a video synchronously, the synchronization error is small under the condition that the decoding computing power is sufficient and the playing initiation synchronization is adopted. In order to ensure the smooth and coherence of the picture during the synchronization calibration, only one frame may be skipped for each frame skipping. If the error is large or the synchronization control error is allowed to be large, more than one frame may be skipped once.

If the video file does not contain audio or subtitle files, the processing is completed. If there are audio or subtitle files in the video, the synchronization for audio and video and subtitle file display are carried out according to PTS of the video frame. And finally, the synchronization calibration of all the slave playing terminals is realized, thus realizing the synchronous display of multi-screen video.

An embodiment of the present disclosure also provides a playing terminal, which includes: a memory, and a processor coupled to the memory, wherein the processor is configured to perform acts of the method for multi-screen video display as described in any embodiment of the present disclosure based on instructions stored in the memory.

An embodiment of the present disclosure also provides a storage medium on which a computer program is stored, and when the program is executed by the processor, the method for multi-screen video display as described in any embodiment of the present disclosure is implemented.

In some possible embodiments, aspects of the method for multi-screen video display provided by the present application may also be implemented in the form of a program product, which includes a program code. When the program product is run on a computer device, the program code is used to enable the computer device to perform the acts in the method for multi-screen video display according to various exemplary embodiments of the present application as described in this specification. For example, the computer device may perform the method for multi-screen video display described in the embodiments of the present application.

For the program product, any combination of one or more readable media may be used. The readable medium may be a readable signal medium or a readable storage medium. The readable storage medium may be, for example, but is not limited to, an electrical, magnetic, optical, electromagnetic, infrared, or semiconductor system, apparatus, or device, or a combination of any of the above. More specific examples (non-exhaustive list) of the readable storage medium include: an electrical connection with one or more wires, a portable disk, a hard disk, a Random Access Memory (RAM), a Read-only Memory (ROM), an Erasable Programmable Read-only Memory (EPROM or flash memory), an optical fiber, a portable Compact Disk Read-only Memory (CD-ROM), an optical storage device, a magnetic storage device, or any suitable combination of the above.

The drawings of the present disclosure only involve structures involved in the present disclosure, and other structures may refer to conventional designs. The embodiments of the present disclosure and features in the embodiments may be combined to each other to obtain new embodiments if there is no conflict.

Those of ordinary skills in the art should understand that modifications or equivalent replacements may be made to the technical solutions of the present disclosure without departing from the essence and scope of the technical solutions of the present disclosure, and they shall all fall within the scope of the claims of the present disclosure.

The invention claimed is:

1. A method for multi-screen video display, comprising:

decoding and storing, by a slave playing terminal, a preset number of video frames, and sending a ready signal to a master playing terminal;

receiving, by the slave playing terminal, a playing start notification from the master playing terminal, and starting playing video frames;

receiving, by the slave playing terminal, information of a frame to be displayed on the master playing terminal, and calculating an adaptive synchronization threshold range according to the information of the frame to be displayed on the master playing terminal, wherein the adaptive synchronization threshold range=a presentation time stamp of the frame to be displayed on the master playing terminal+an average network transmission delay of the slave playing terminal+a frame type threshold range; when the frame to be displayed on the master playing terminal is a non-I frame, the frame type threshold range is a first threshold range; and when the frame to be displayed on the master playing terminal is an I frame, the frame type threshold range is a second threshold range, the first threshold range is less than the second threshold range;

comparing, by the slave playing terminal, a presentation time stamp of a frame to be displayed on the slave playing terminal with the calculated adaptive synchronization threshold range, to determine whether a playing progress of the slave playing terminal is synchronized with a playing progress of the master playing terminal.

2. The method for multi-screen video display according to claim 1, wherein the first threshold range Basic is calculated by the following formula:

$$\text{Basic} = \pm\alpha * \frac{1}{fps},$$

wnere, 0<α<1, fps is display time of one frame;

the second threshold range Thre_type is calculated by the following formula:

$$\text{Thre\_type} = \beta * \text{Basic, wherein, } \beta > 1.$$

3. The method for multi-screen video display according to claim 1, wherein, when the presentation time stamp of the frame to be displayed on the slave playing terminal is outside the calculated adaptive synchronization threshold range, the slave playing terminal adjusts its own playing progress, or, the slave playing terminal displays or sends alarm information.

4. The method for multi-screen video display according to claim 3, wherein, adjusting, by the slave playing terminal, its own playing progress when the presentation time stamp of the frame to be displayed on the slave playing terminal is outside the calculated adaptive synchronization threshold range, comprises:

when the presentation time stamp of the frame to be displayed on the slave playing terminal is less than a minimum value in the adaptive synchronization threshold range, playing, by the slave playing terminal, a video frame picture of a skipped frame;

when the presentation time stamp of the frame to be displayed on the slave playing terminal is greater than a maximum value in the adaptive synchronization threshold range, maintaining, by the slave playing terminal, a video frame picture currently being played.

5. A playing terminal, comprising a memory, and a processor coupled to the memory, wherein the processor is configured to perform acts of the method for multi-screen video display according to claim 1 based on instructions stored in the memory.

6. A non-volatile storage medium, stored thereon a computer program, wherein when the computer program is executed by a processor, the method for multi-screen video display according to claim 1 is implemented.

7. A method for multi-screen video display, comprising:

detecting, by a master playing terminal, whether all slave playing terminals and the master playing terminal have decoded and stored a preset number of video frames;

after detecting that all the slave playing terminals and the master playing terminal have decoded and stored the preset number of video frames, notifying, by the master playing terminal, all the slave playing terminals to start playing;

sending, by the master playing terminal, information of a frame to be displayed on the master playing terminal to all the slave playing terminals, to enable each of all the slave playing terminals to calculate an adaptive synchronization threshold range according to the information of the frame to be displayed on the master playing terminal and to determine whether its own playing progress is synchronized with a playing progress of the master playing terminal according to a presentation time stamp of a frame to be displayed on the slave playing terminal and the calculated adaptive synchronization threshold range, wherein the adaptive synchronization threshold range=a presentation time stamp of the frame to be displayed on the master playing terminal+an average network transmission delay of the slave playing terminal+a frame type threshold range; when the frame to be displayed on the master playing terminal is a non-I frame, the frame type threshold range is a first threshold range; and when the frame to be displayed on the master playing terminal is an I frame, the frame type threshold range is a second threshold range, the first threshold range is less than the second threshold range.

8. The method for multi-screen video display according to claim 7, wherein, detecting, by the master playing terminal, whether all the slave playing terminals have decoded and stored the preset number of video frames by detecting whether the master playing terminal has received ready signals of all the slave playing terminals;

notifying, by the master playing terminal, all the slave playing terminals to start playing by sending a playing initiation signal to all the slave playing terminals.

9. The method for multi-screen video display according to claim 7, wherein the information of the frame to be displayed sent by the master playing terminal comprises a frame type and the presentation time stamp, and the frame type comprises the I frame, a P frame and a B frame.

10. The method for multi-screen video display according to claim 7, when the frame to be displayed on the master playing terminal is the I frame, the method further comprises:

sending, by the master playing terminal, a connection confirmation signal to all the slave playing terminals, and receiving feedback confirmation signals from all the slave playing terminals.

11. The method for multi-screen video display according to claim 7, wherein before detecting, by the master playing terminal, whether all the slave playing terminals and the master playing terminal have decoded and stored the preset number of video frames, the method further comprises:

establishing, by the master playing terminal, communication connections with all the slave playing terminals.

12. The method for multi-screen video display according to claim 7, wherein when a video currently being played ends, the method further comprises:

sending, by the master playing terminal, a playing termination signal to all the slave playing terminals, and receiving feedback termination signals from all the slave playing terminals.

13. A playing terminal, comprising a memory, and a processor coupled to the memory, wherein the processor is configured to perform steps of the method for multi-screen video display according to claim 7 based on instructions stored in the memory.

14. A non-volatile storage medium, stored thereon a computer program, wherein when the computer program is executed by a processor, the method for multi-screen video display according to claim 7 is implemented.

15. A method for multi-screen video display, comprising:

detecting, by a master playing terminal, whether all slave playing terminals and the master playing terminal have decoded and stored a preset number of video frames;

after detecting that all the slave playing terminals and the master playing terminal have decoded and stored the preset number of video frames, notifying, by the master playing terminal, all the slave playing terminals to start playing;

sending, by the master playing terminal, information of a frame to be displayed on the master playing terminal to all the slave playing terminals;

receiving, by each slave playing terminal, the information of the frame to be displayed on the master playing terminal, and calculating an adaptive synchronization threshold range according to the information of the frame to be displayed on the master playing terminal, and comparing a presentation time stamp of its own frame to be displayed with the calculated adaptive synchronization threshold range, to determine whether its own playing progress is synchronized with a playing progress of the master playing terminal, wherein the adaptive synchronization threshold range=a presentation time stamp of the frame to be displayed on the master playing terminal+an average network transmission delay of the slave playing terminal+a frame type threshold range; when the frame to be displayed on the master playing terminal is a non-I frame, the frame type threshold range is a first threshold range; and when the frame to be displayed on the master playing terminal is an I frame, the frame type threshold range is a second threshold range, the first threshold range is less than the second threshold range.

16. A system for multi-screen video display, comprising a plurality of playing terminals, wherein the playing terminals comprise one master playing terminal according to claim 13 and one or more slave playing terminals, wherein:

a slave playing terminal is configured to receive the information of the frame to be displayed on the master playing terminal, and calculate the adaptive synchronization threshold range according to the information of the frame to be displayed on the master playing terminal, and compare the presentation time stamp of its own frame to be displayed with the calculated adaptive synchronization threshold range, to determine whether its own playing progress is synchronized with the playing progress of the master playing terminal.

17. The system for multi-screen video display according to claim 16, wherein the master playing terminal is elected from the plurality of playing terminals, and the election rule comprises any one of the followings:

a playing terminal that first communicates with a server terminal is the master playing terminal, and the other playing terminals are the slave playing terminals;

a playing terminal with the best hardware performance is the master playing terminal, and the other playing terminals are the slave playing terminals; and a playing terminal with the shortest average connection time with all other playing terminals is the master playing terminal, and the other playing terminals are the slave playing terminals.

18. The system for multi-screen video display according to claim 16, further comprising a server terminal, wherein:

the server terminal is configured to perform real-time differentiation processing on video content and provide processed video bit stream to the plurality of playing terminals, wherein the differentiation processing comprises video attribute change and video content variation.

* * * * *